United States Patent [19]
Nakanishi et al.

[11] 3,915,981
[45] Oct. 28, 1975

[54] 1-[2-(2-CHLOROBENZOYL)-4-NITROPHENYL]-2-(DIETHYLAMINOMETHYL)-IMIDAZOLE

[75] Inventors: Michio Nakanishi, Oita; Tetsuo Yokobe, Fukuoka; Tomio Arai, Fukuoka; Masao Abe, Fukuoka, all of Japan

[73] Assignee: Yoshitomi Pharmaceutical Industries Ltd., Osaka, Japan

[22] Filed: Jan. 9, 1974

[21] Appl. No.: 431,993

[30] Foreign Application Priority Data
Mar. 16, 1973 Japan............................... 48-31153
Mar. 20, 1973 Japan............................... 48-32157

[52] U.S. Cl........... 260/309; 260/570 AB; 260/591; 424/273
[51] Int. Cl.²..................................... C07D 233/64
[58] Field of Search................................ 260/309

[56] References Cited
UNITED STATES PATENTS
3,763,179  10/1973  Gall ................................... 260/309

OTHER PUBLICATIONS
J. Med. Chem., 12: 1024–1028, (1969), Johnson et al.

Primary Examiner—Sherman D. Winters
Attorney, Agent, or Firm—Sughrue, Rothwell, Mion, Zinn & Macpeak

[57] ABSTRACT

1-[2-(2-Chlorobenzoyl)-4-nitrophenyl]-2-(diethylaminomethyl)imidazole of the formula:

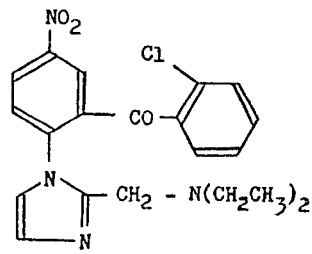

and pharmaceutically acceptable acid addition salts thereof, pharmaceutical compositions containing the same, and methods of treating cerebral dysfunction in mammals therewith are disclosed.

2 Claims, No Drawings

1-[2-(2-CHLOROBENZOYL)-4-NITROPHENYL]-2-(DIETHYLAMINOMETHYL)-IMIDAZOLE

BACKGROUND OF THE INVENTION

1. Field of the Invention

The present invention relates to an imidazole compound and acid addition salts thereof having therapeutically valuable properties, pharmaceutical compositions containing the said compound and the use thereof.

2. Description of the Prior Art

Compounds of the formula:

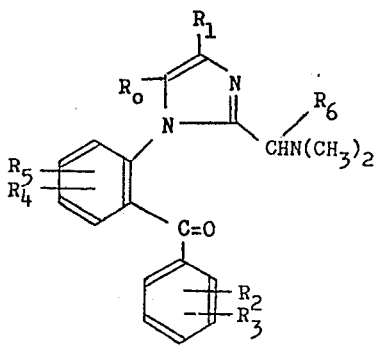

and pharmaceutically acceptable acid addition salts thereof, wherein $R_0$ and $R_1$ are each H, $C_{1-3}$ alkyl or hydroxymethyl, $R_2$, $R_3$, $R_4$ and $R_5$ are each H, $C_{1-3}$ alkyl, halogen, nitro, trifluoromethyl, $C_{1-3}$ alkoxy, $C_{1-3}$ alkylthio, $C_{1-3}$ alkylsulfinyl, $C_{1-3}$ alkylsulfonyl or di($C_{1-3}$ alkyl)amino, and $R_6$ is H or $C_{1-3}$ alkyl, are disclosed in U.S. Pat. No. 3,763,179 and have utility as sedatives and tranquilizers.

SUMMARY OF THE INVENTION

This invention concerns 1-[2-(2-chlorobenzoyl)-4-nitrophenyl]-2-(diethylaminomethyl)imidazole of the formula:

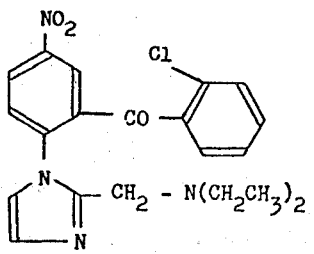

and pharmaceutically acceptable acid addition salts thereof, pharmaceutical compositions containing the said compound and the use thereof.

The novel compound of the present invention exhibits pharmacological activities in the form of protective activities on cerebral hypoxic or anoxic conditions, and cerebral blood flow increasing activity, which activities permit such compound to be employed in the treatment of cerebral dysfunction, for example, cerebral arteriosclerosis, cerebral apoplexy and head trauma, due to cerebral anoxia, cerebral metabolic dysfunction, decrease in cerebral blood flow and so on.

The toxicity of the compound of the invention in mice and rats is of very low order.

DETAILED DESCRIPTION OF THE INVENTION

The 1-[2-(2-chlorobenzoyl)-4-nitrophenyl]-2-(diethylaminomethyl)imidazole of the invention can be produced by reacting a compound of the formula:

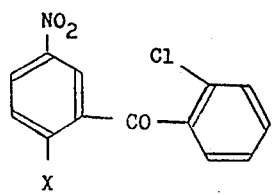

wherein X is a halogen atom (F, Cl or Br), with 2-(diethylaminomethyl)imidazole.

The reaction is usually carried out in an inert solvent such as benzene, toluene, methanol, ethanol, acetone, methyl ethyl ketone, tetrahydrofuran, dimethylformamide, N-methylbutyrolactam, hexamethylphosphorotriamide, dimethyl sulfoxide or a mixture thereof, in the presence of an acid-acceptor such as triethylamine, sodium carbonate, potassium carbonate, sodium hydroxide, potassium hydroxide, sodium methoxide, sodium ethoxide, sodium hydride, sodium amide or powdery sodium, at a temperature of from about 0°C to refluxing temperature of the solvent employed, for a period of from about 1 to several hours.

The imidazole compound thus produced can be converted into the corresponding acid addition salts in a conventional manner by treating the compound with various inorganic and organic acids, for example, hydrochloric, hydrobromic, sulfuric, oxalic, maleic and fumaric acids.

The compund of formula (I) and pharmaceutically acceptable acid addition salts thereof are excellent in protective activities on cerebral hypoxic or anoxic conditions, and cerebral blood flow increasing activity. For example, the protective activity on cerebral asphyxic anoxia of 1-[2-(2-chlorobenzoyl)-4-nitrophenyl]-2-(diethylaminomethyl)imidazole fumarate of the invention is illustratively demonstrated according to the following method:

The protective activity on asphyxic anoxia of the brain was tested by electroencephalographic studies in rats.

The experimental procedure employed was essentially similar to that described by Roser, I. et al. [Arch. Int. Pharmacodyn. Ther., vol. 194, pp. 375–380 (1971)]. Wistar female rats weighting 160 to 210 g were used. After thiamylal sodium anesthesia the animals were immobilized with gallamine triethiodide, and electrocardiogram were recorded. The test compound was administered intraperitoneally as the suspension in 0.5% methylcellulose solution, and 30 minutes later the animals were subjected to asphyxic anoxia by stopping the artificial respiration. The cortical resistance time, the time elasped between stopping the artificial respiration and the cessation of cortical activity, was determined. The minimal effective dose (MED), a dose required to prolongate the cortical resistance time significantly compared with the control group, was assessed by Student's $t$ test to be 0.1 mg/kg.

In view of various tests, including that mentioned above, the compound of the invention and pharmaceutically acceptable acid addition salts thereof can be safely administered for the treatment of cerebral dysfunction, for example, cerebral arteriosclerosis, cerebral apoplexy and head trauma, in the form of a pharmaceutical preparation with a suitable and conventional pharmaceutically acceptable carrier, without adversely affecting the patients.

The pharmaceutical preparations can take any conventional form such as tablets, capsules, powders or injections.

Formulation Examples a. Tablets each containing 1 mg or 0.1 mg of an active ingredient are prepared from the following compositions:

|  | 1 mg Tablets | 0.1 mg Tablets |
|---|---|---|
| Compound (I) or its salt | 1.0 mg | 0.1 mg |
| Lactose | 66.3 | 67.2 |
| Corn Starch | 25.0 | 25.0 |
| Microcrystalline Cellulose | 6.0 | 6.0 |
| Methyl Cellulose | 1.0 | 1.0 |
| Magnesium Stearate | 0.7 | 0.7 |
|  | 100.0 mg | 100.0 mg | b. An 1% powder is prepared from the following compositions:

| Compound (I) or its salt | 1% by weight |
|---|---|
| Lactose | 88 |
| Microcrystalline Cellulose | 10 |
| Methyl Cellulose | 1 |
|  | 100% | c. 0.1 mg or 0.5 mg injections are prepared from the following compositions:

| Compound (I) as the fumarate | 0.1 mg or 0.5 mg |
|---|---|
| 5% Glucose aqueous solution | A sufficient quantity to make 1.0 ml |

The daily dose of compound (I) or a salt thereof for human adults usually ranges from about 0.3 to 3 mg, in single or multiple dose, but it may vary depending upon the age, body weight, and/or severity of the conditions to be treated as well as the response to the medication.

The present invention will be better understood from the following example, but it is not to be construed as limiting the present invention.

EXAMPLE

To a solution of 15.3 g of 2-(diethylaminomethyl)imidazole in 100 ml of dimethylformamide is added 4.6 g of a 50% suspension of sodium hydride in mineral oil. After stirring the mixture at room temperature for 30 minutes, 29.6 g of 2,2'-dichloro-5-nitrobenzophenone is added under ice cooling, and the whole mixture is stirred at room temperature for 2 hours and then at 60°C for an additional 1 hour. The reaction mixture is then concentrated under reduced pressure, water is added to the residue, and the aqueous mixture is extracted with ethyl acetate. The ethyl acetate phase is extracted with 5% hydrochloric acid, the acid phase is neutralized with sodium carbonate, and the solution is reextracted with ethyl acetate. The ethyl acetate phase is washed with water, and filtered with activated charcoal. The filtrate is dried over magnesium sulfate and concentrated under reduced pressure. The residue is recrystallized from isopropyl ether to give 33.1 g of 1-[2-(2-chlorobenzoyl)-4-nitrophenyl]-2-(diethylaminomethyl)imidazole as pale yellow crystals, melting at 75°–76°C. The corresponding fumarate (pale yellow crystals) shows a melting point of 157°–158°C.

PREPARATION OF STARTING MATERIALS a. 2-(Diethylaminomethyl)imidazole

A solution of 14.3 g of thionyl chloride in 50 ml of chloroform is added dropwise to a solution of 18.8 g of 1-benzyl-2-(hydroxymethyl)imidazole in 200 ml of chloroform over a period of 30 minutes under ice cooling with stirring. The stirring is continued at room temperature for an additional one hour. The reaction mixture is then concentrated under reduced pressure, and the residue is dissolved in a mixture of 50 ml of dimethylformamide and 100 ml of benzene. There is obtained the solution containing 1-benzyl-2-(chloromethyl)imidazole hydrochloride.

To the above solution are added 15 g of diethylamine and 21.5 g of sodium carbonate, and the resulting mixture is refluxed with stirring for 5 hours. The reaction mixture is then poured into ice water, and the aqueous mixture is extracted with ethyl acetate. The extract is washed with water, dried over magnesium sulfate and concentrated under reduced pressure. The residue is vacuum distilled to give 23.2 g of 1-benzyl-2-(diethylaminomethyl)imidazole as colorless viscous oil, boiling at 136°–138°C/0.05 mmHg.

To a solution of 21.9 g of 1-benzyl-2-(diethylaminomethyl)imidazole in 300 ml of liquid ammonia is added by portions 5 g of metallic sodium over a period of 30 minutes with stirring. The stirring is continued for an additional 1 hour. A small amount of ethanol is added to the reaction mixture in order to decompose the excess sodium, and the ammonia and ethanol are removed perfectly. To the residue is added a small amount of water, and the aqueous mixture is extracted with methylene chloride. The extract is washed with a small amount of a saturated aqueous sodium chloride solution, dried over magnesium sulfate and concentrated under reduced pressure to give 13.5 g of 2-(diethylaminomethyl)imidazole as pale yellow crystals, melting at 73°–74°C.

b. 2,2'-Dichloro-5-nitrobenzophenone

To a suspension of 5 g of 2-amino-2'-chloro-5-nitrobenzophenone in 60 ml of concentrated hydrochloric acid is added a solution of 4 g of sodium nitrite in a small amount of water over a period of 30 minutes at −5° to −10°C with stirring. The stirring is continued at −5° to −10°C for one hour and then at room temperature for an additional 1 hour. To the above mixture is added 3 g of cuprous chloride, and the resulting mixture is stirred at 90°C for 30 minutes. Ice (100 g) is added to the reaction mixture, and the mixture is extracted with ethyl acetate. The extract is washed with water, dried over magnesium sulfate and concentrated under reduced pressure. The residue is recrystallized from methanol to give 5.1 g of 2,2'-dichloro-5-nitrobenzophenone as colorless crystals, melting at 83°–84°C.

While the invention has been described in detail and with reference to specific embodiments thereof, it will be apparent to one skilled in the art that various changes and modifications can be made therein without departing from the spirit and scope thereof.

What is claimed is:

1. 1-[2-(2-chlorobenzoyl)-4-nitrophenyl]-2-(diethylaminomethyl)imidazole.

2. A pharmaceutically acceptable acid addition salt of the compound of claim 1.

* * * * *